United States Patent [19]

Ford et al.

[11] Patent Number: 5,258,697
[45] Date of Patent: Nov. 2, 1993

[54] EFFICIENT PERMANENT MAGNET ELECTRIC MOTOR

[75] Inventors: James R. Ford, Brea, Calif.; William H. Johnson, Colchester, Vt.; W. DeWitt Lyon, Fullerton, Calif.

[73] Assignee: Varelux Motor Corp., Calif.

[21] Appl. No.: 780,968

[22] Filed: Oct. 23, 1991

[51] Int. Cl.⁵ .............................................. H02P 7/00
[52] U.S. Cl. .................................. 318/498; 318/254; 310/156
[58] Field of Search ............... 318/254, 138, 439, 498; 310/154, 156, 180, 181

[56] References Cited

U.S. PATENT DOCUMENTS

| | | | |
|---|---|---|---|
| 2,816,240 | 12/1957 | Zimmerman | 310/156 |
| 3,134,038 | 5/1964 | Schilling | 310/156 |
| 3,482,156 | 12/1969 | Porath | 310/156 |
| 4,223,263 | 9/1980 | Hansen, Jr. et al. | 310/156 X |
| 4,355,249 | 10/1982 | Kenwell | 310/177 X |
| 4,417,167 | 11/1983 | Ishii et al. | 310/156 X |
| 4,433,261 | 2/1984 | Nashiki et al. | 310/156 |
| 4,464,592 | 8/1984 | Major | 310/54 |
| 4,504,751 | 3/1985 | Meier | 318/254 X |
| 4,549,104 | 10/1985 | Niimura et al. | 310/156 |
| 4,553,075 | 11/1985 | Brown et al. | 318/254 |
| 4,636,671 | 1/1987 | Terada | 310/74 |
| 4,642,534 | 2/1987 | Mitchell | 318/138 |
| 4,661,736 | 4/1987 | Kawada et al. | 310/156 |
| 4,678,954 | 7/1987 | Takeda et al. | 310/156 |
| 4,698,538 | 10/1987 | Yoshida | 310/179 |
| 4,724,368 | 2/1988 | Andrews | 318/439 |
| 4,769,567 | 9/1988 | Kurauchi et al. | 310/156 |
| 4,841,204 | 6/1989 | Studer | 318/254 |
| 4,864,199 | 9/1989 | Dixon | 318/254 |
| 4,874,975 | 10/1989 | Hertrich | 310/156 |
| 4,972,112 | 11/1990 | Kim | 310/181 |
| 5,030,868 | 7/1991 | Suzuki et al. | 310/156 |

FOREIGN PATENT DOCUMENTS

| | | |
|---|---|---|
| 2367374 | 10/1976 | France . |
| 85566 | 5/1982 | Japan . |
| 6512377 | 3/1966 | Netherlands . |
| 862322 | 9/1981 | U.S.S.R. . |

OTHER PUBLICATIONS

Electro-Craft Corp Handbook 1978, pp. 2-66.

*Primary Examiner*—Jonathan Wysocki

[57] ABSTRACT

An electric motor, of the type that includes a rotor with permanent magnets and a stator with electromagnets, which operates at high efficiency to produce a high ratio of mechanical power output to electrical power input. During rotor rotation in a first direction (74, FIG. 5), a first magnet (44A') moves away from a position of alignment with the core of a "last" electromagnet (46A), while a second permanent magnet (44B') moves toward a position of alignment with the core of a "next" electromagnet (46C) which it is approaching. The last electromagnet (46A) is energized in a direction to negate attraction of its core (50) for the first permanent magnet (44A'). The next electromagnet (46C) is not substantially energized, so the attraction of the second magnet for the next electromagnet (46C) is due primarily to attraction of their cores in the absence of energization of the next electromagnet. Thus, most electrical power supplied to the electromagnets are to negate attraction between a permanent magnet and the last electromagnet which the permanent magnet is moving away from. This allows most motor output torque to arise from the attraction of permanent magnets for the cores of unenergized electromagnets that the permanent magnets are approaching.

9 Claims, 6 Drawing Sheets

5,258,697

EFFICIENT PERMANENT MAGNET ELECTRIC MOTOR

BACKGROUND OF THE INVENTION:

Permanent magnet motors where permanent magnets are spaced about the rotor and interact with electromagnets spaced about the stator, provide efficient motors for energization from direct current sources such as batteries. In such motors, the electromagnets are energized at high current levels to attract and/or repel the permanent magnets to produce a mechanical power output. The considerable currents result in considerable resistive losses and heat generation. Especially where the motor is to be battery powered, as in electrically powered automobiles, obtaining high efficiency in the ratio of mechanical power output to electrical power input is of great importance. A permanent magnet motor which provided increased efficiency, would be of considerable value.

SUMMARY OF THE INVENTION

In accordance with one embodiment of the present invention, a permanent magnet motor and energization method are provided, which results in high motor efficiency. At least during moderate load conditions, electromagnets are energized primarily to negate attraction to permanent magnets that are moving away from the electromagnets. Thus, when a first permanent magnet is moving away from the core of a "last" electromagnet and a second permanent magnet is moving towards a "next" electromagnet, current is used primarily to negate the attraction of the first permanent magnet to the last electromagnet. Torque is obtained by the magnetic attraction of the second magnet towards the core of the next electromagnet.

The current applied to a last electromagnet (where the adjacent permanent magnet is moving away from it) is preferably adjusted so the current varies to maintain a largely zero net force between the core of the electromagnet and the permanent magnet moving away from it. The permanent magnet is of a material such as Nd-B-Fe (neodymium-boron-iron) which has a greater coercive force (the force required to demagnetize the magnet) than its induction, so the permanent magnet cannot demagnetize itself. This allows a permanent magnet of small thickness to be used, which results in requiring less current flow to the last electromagnet to negate the attractive force. Open magnetic circuit and closed magnetic circuit arrangements are described, with the closed circuit arrangement placing both poles (north and south) of each electromagnet adjacent to the corresponding poles of each permanent magnet.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
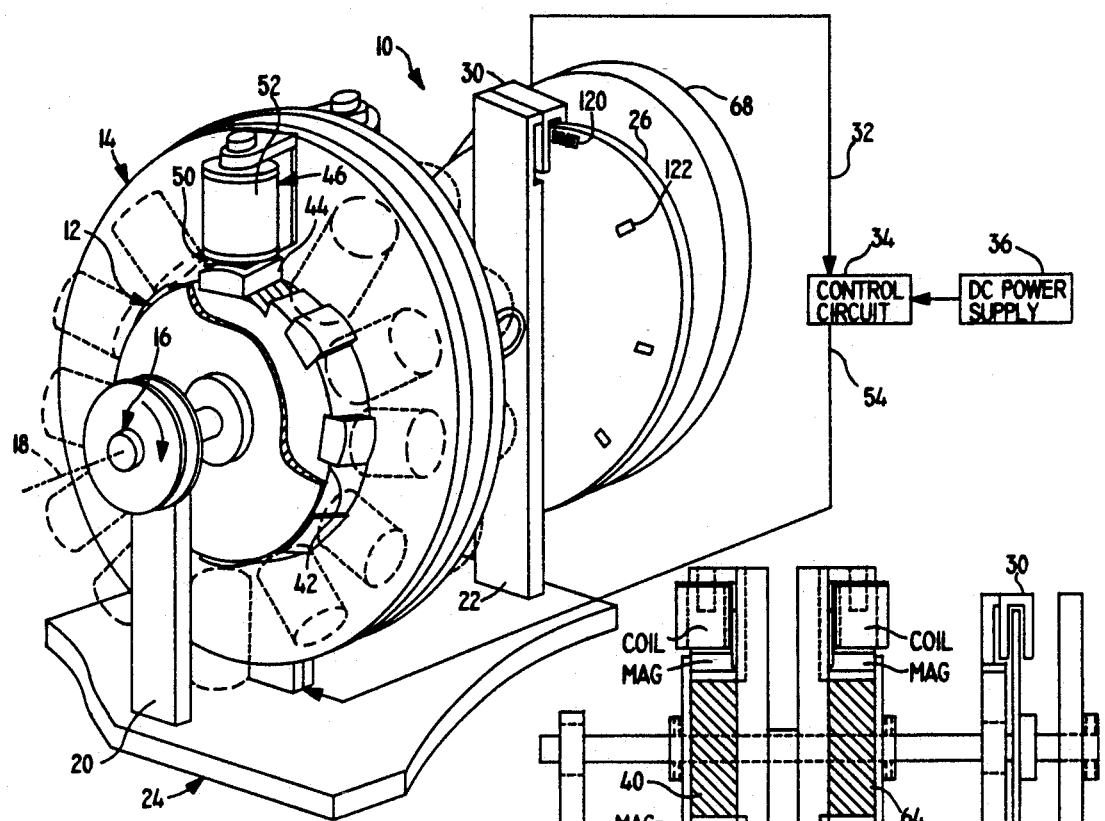
FIG. 1 is a partial isometric view of a motor constructed in accordance with one embodiment of the present invention.

FIG. 1 illustrates an electric motor 10 which includes a rotor assembly or rotor 12 and a stator assembly or stator 14. The rotor has a shaft 16 that is rotatable about an axis of rotation 18 on bearings mounted on supports 20, 22 of a support assembly 24. An index wheel 26 is fixed to the rotor shaft and passes across an index sensor 30 which senses the rotational position of the rotor. The output of the index sensor is delivered over a sensor line 32 to a control circuit 34. The control circuit is connected to a DC power supply 36 such as a group of batteries. The control circuit controls the delivery of current from the power supply to the stator of the rotor, to energize the motor so as to rotate it.

The rotor includes a rotor body 40 and a group of permanent magnets 44 spaced about the periphery of the rotor and its body. The stator 14 includes a group of electromagnets 46 that interact with the permanent magnets on the rotor. Each permanent magnet includes a core 50 of ferromagnetic material such as silicon steel and a winding 52 that is connected through wires of a cable 54 to the control circuit. The control circuit energizes selected electromagnets (the windings thereof) in a manner to be described below, which causes rotation of the rotor so it can produce a considerable mechanical output.

Figure 3:
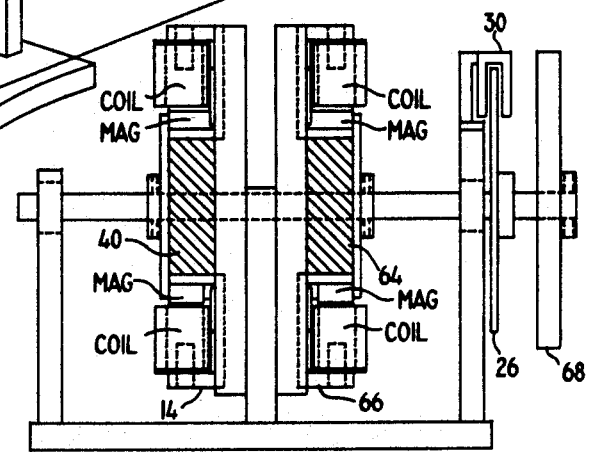
FIG. 3 is a partially sectional side view of the motor of FIG. 2.
Figure 2:
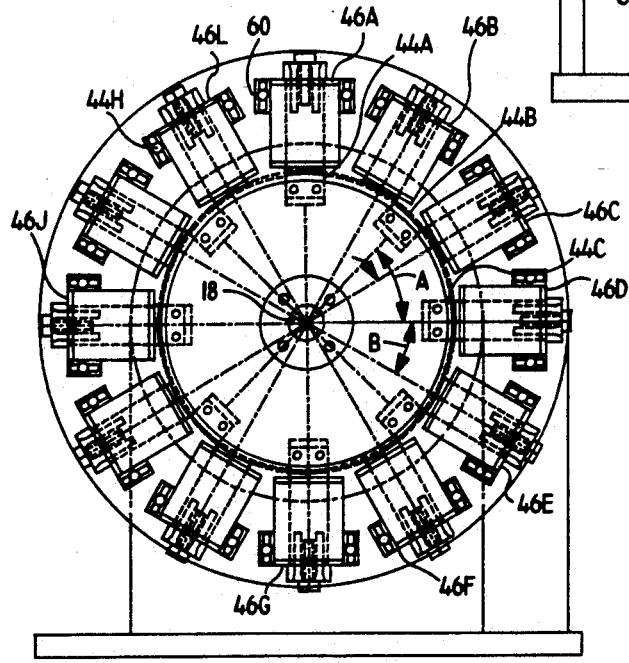
FIG. 2 is a front elevation view of the motor of FIG. 1.

As shown in FIG. 2, the particular motor has eight PMs (permanent magnets) 44A-44H which are uniformly spaced about the rotor axis 18 along the periphery 60 of the rotor (of its rotor body). Thus, the PMs are spaced apart by an angle A of 45°. The motor has twelve EMs or electromagnets 46A-46L that are also uniformly spaced about the axis 18 so they are spaced apart by an angle B of 30°. As shown in FIG. 3, the particular motor includes two rotors 40, 64 and two corresponding stators 14, 66, and also includes a flywheel 68.

Figure 4:
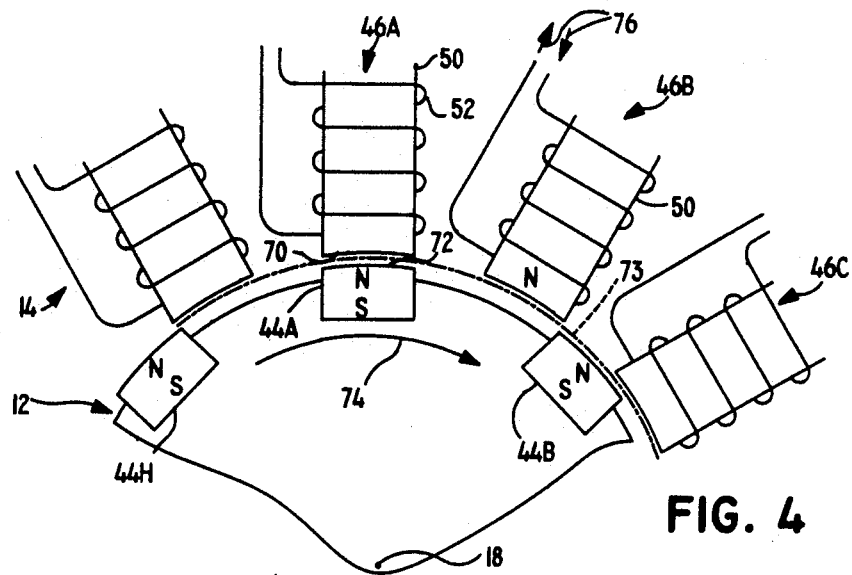
FIG. 4 is a simplified partial view of the motor of FIG. 2, with a permanent magnet in a center alignment position.
Figure 5:
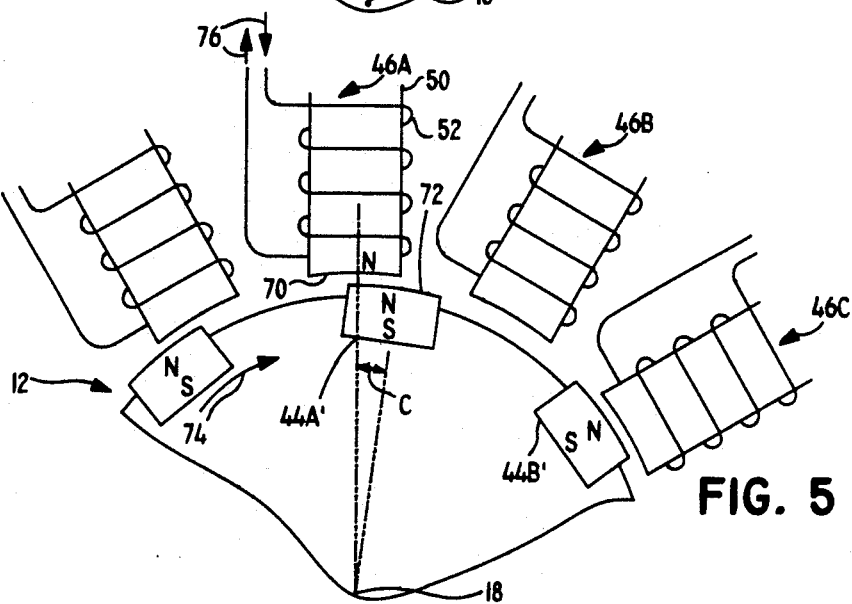
FIG. 5 is a view similar to that of FIG. 4, but with the rotor turned 10° clockwise.
Figure 6:
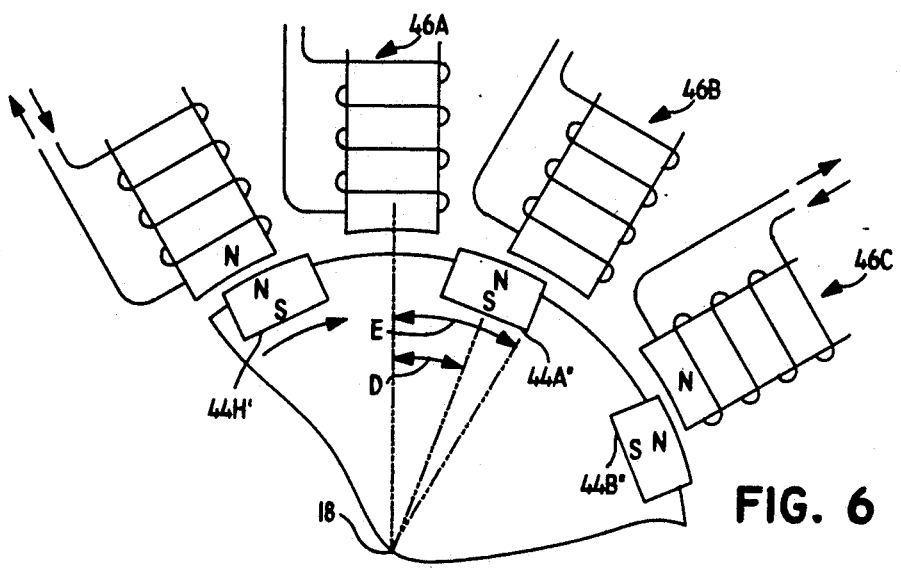
FIG. 6 is a view similar to that of FIG. 4, but with the rotor turned 20° clockwise.

Reference is made to FIGS. 4-6 which indicate the manner in which the motor is energized. With the relative positions of the rotor and stator 12, 14 as shown in FIG. 4, it can be seen that a first PM 44A is in a center alignment position with the core 50 of the electromagnet 46A. The core 50 has a face 70 lying close to the path of the faces 72 of the PMs with only a small air gap between them at an imaginary interface circle 73. At the orientation of FIG. 4, the first electromagnet 46A (the winding 52 thereof) does not carry any current, as such current does not help rotation. A second PM 44B lies half-way between the second and third electromagnets 46B and 46C. If no current flowed through either electromagnet 46B or 46C, then the permanent magnet 44B would be equally attracted to the cores of both electromagnets and there would be no net torque tending to rotate the rotor in the direction of arrow 74. Applicant flows a current, indicated by arrows 76, through the windings of the second electromagnet 46B to magnetize the core 50 of that electromagnet to allow the second PM 44B to move away from the core of the electromagnet 46B.

In accordance with present invention, the amount of current 76 passed through the second electromagnet 46B is only that which is required to create a substantially zero force between the second PM 44B and second electromagnet 46B. With substantially no force dragging the second PM 44B backward (opposite to arrow 74) the main force on the second PM 44B is towards the core of the third electromagnet 46C. The third electromagnet 46C is not energized (no current flows through its windings) so the only force between the PM 44B and electromagnet 46C is the magnetic attraction of the PM 44B for the "soft iron" core of the third electromagnet 46C. Thus, the forces tending to rotate the rotor in the direction of arrow 74 are the forces of attraction of PMs such as 44B for the cores of substantially unenergized electromagnets such as that of electromagnet 46C which the magnet 44B is approaching. Except when high loads are applied, as when an electric car must rapidly accelerate or must move at high speed, most, (over 50 per cent) and preferably almost all (over 75 per cent) torque rotating the rotor arises from the attraction of some PMs towards the cores of substantially unenergized electromagnets that the PMs are approaching. Most (over 50 per cent) and preferably almost all (over 75 per cent), of the current supplied to the motor at moderate loads is used to negate the backward force on those PMs that are moving away from the core of a "last" electromagnet that the PM was just previously aligned with.

FIG. 5 illustrates the motor of FIG. 4, after the rotor 12 has rotated by an angle C of 10°. As a result, the first PM is at the position 44A' wherein it is moving away from the first electromagnet 46A and toward the second electromagnet 46B. The first electromagnet 46A can therefore be considered to be the "last" electromagnet (the last one that the PM was aligned with) and the second electromagnet 46B can be considered to be the "next" electromagnet (the one that the PM will next be in alignment with). At this time, the first electromagnet 46A will be energized as indicated by arrows 76 to make its face 70 have a north magnetic pole of relatively low intensity. The low north pole magnetic flux density produced at the face 70 of electromagnet 46A, by current flow, is sufficient to substantially cancel the attraction between the north pole face at 72 of the first PM at 44A', and the core 50 of the first electromagnet. This avoids a backward force on the PM 44A', so its attraction for the core of the second electromagnet 46B can be used to turn the rotor.

FIG. 6 illustrates the motor after the rotor has turned by an angle D of 20° from the position of FIG. 4, so that the first PM has moved to the position 44A". Since the first PM at 44A" is still moving away from the first electromagnet 46A, a current can continue to be applied to the first electromagnet to negate the backward pull on the first PM 44A". However, if there is any current through the first electromagnet, it should be small, to avoid substantial repulsion of the PM at 44H" which is approaching the first electromagnet 46A. It also can be seen that the second PM 44B" has moved past a position of alignment with the third electromagnet 46C (which it attained after 15° of rotor rotation from the position of FIG. 4). As a result, the third electromagnet 46C is the "last" electromagnet for the PM at 44B", and such last electromagnet 46C is energized to negate the backward attraction of the second PM 44B". In the manner described above, each "last" electromagnet is energized to negate attraction for the PM moving away from it (at least until the approaching permanent magnet comes close), while the "next" electromagnet which the PM is approaching, is substantially unenergized and torque is provided by attraction of the PM for the core of the unenergized next electromagnet. The angle E of 30° is the angle to which the first PM 44A" must be turned to be at a center alignment position with second electromagnet 46B.

In a simpler notation, it is possible to identify the three electromagnets 46A–46C as "EMA, EMB, and EMC", and to identify the permanent magnets 44A and 44B as "PM1 and PM2".

Figure 7:
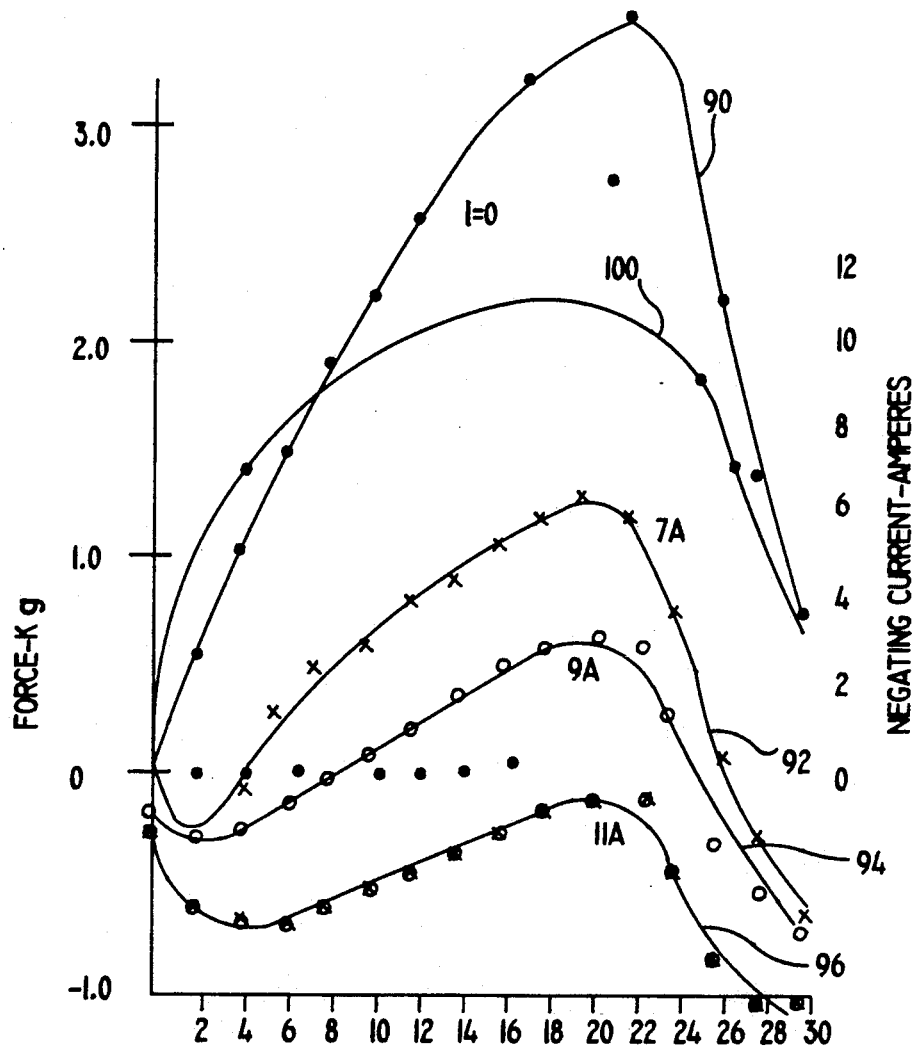
FIG. 7 is a graph showing force versus displacement when a single magnet is moved linearly with respect to a single electromagnet, and also showing the variation in current required to produce a zero force.

FIG. 7 illustrates the results of an experiment wherein a single permanent magnet was moved in a line away from a single electromagnet, this occurring several times, with a different constant current applied to the electromagnet each time. The current was in a direction to magnetize the core of the electromagnet to repel the permanent magnet. The variation in force of the permanent magnet with distance from its center alignment position with the electromagnet, was measured. The permanent magnet had a face area of one inch by one inch and was constructed of neodymium-boron-iron. The electromagnet had a corresponding face, and included 300 turns of wire. A first curve 90 shows the variation in force in kilograms on the vertical scale versus the displacement in millimeters on the horizontal scale, when the current was zero. The greatest force occurred at a displacement of 22 mm which is about 85 per cent of the width of the facing poles. A second curve 92 shows a situation when a constant current seven amperes was passed through the winding of the electromagnet, the curve showing that this resulted in zero force at displacements of about 4.1 and 26.3 mm. Curve 94 shows a situation when nine amperes and curve 96 shows a situation when eleven amperes, was passed through the coil. From these curves 90–96, applicant has constructed the curve 100 which shows approximately the amount of negating current that should pass through the electromagnet so there is substantially zero force between the permanent magnet and the electric magnet as the permanent magnet moves away from a position of alignment.

Figure 8:
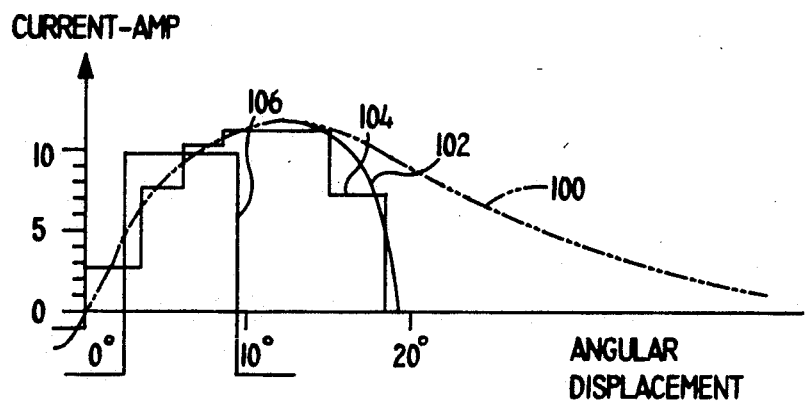
FIG. 8 is a graph showing variation in current with rotor rotation for the motor of FIG. 1 in order to produce substantially zero force between a permanent magnet and a last electromagnet.

FIG. 8 includes a curve 100 representing the variation in current to an electromagnet, with displacement of a permanent magnet therefrom, to achieve substantially zero force between them, as the permanent magnet rotates on a rotor. However, in a real motor such as the one of FIGS. 1–6, as one permanent magnet moves away from an electromagnet, another permanent magnet moves closer thereto. At a rotation angle at 22.5°, the two permanent magnets (44A and 44H) are equally spaced from the core of the permanent magnet (46A). Curve 102 represents a better variation of current with angular rotation of the rotor (where 0° is where a permanent magnet is aligned with the electromagnet to be energized). It can be seen that the current falls rapidly at an angular rotation of more than about 15° to avoid repulsion of the permanent magnet that is approaching the electromagnet. Although it is possible to provide an analog variation of voltage to each electromagnet with angular rotation, the circuitry would be expensive and result in considerable losses. The graph 104 represents an approximation to the curve 102, achieved by changing the voltage in steps, at angles of rotation of 3° each, to approximately follow the analog curve 102. It can be seen that the current level at 9° (which is 30 per cent of the total angle E of 30° between positions of alignment of the magnet with two adjacent electromagnets) is greater than the current level at 3° (which is ten per cent of the total angle).

The winding of each electromagnet acts as an inductor that resists a change in current passing through it. If the inductance is high, then it can be difficult to vary the current in the manner indicated by graph 104. FIG. 8 includes another graph 106 which represents the application of a single large voltage pulse to the winding of an electromagnet to largely negate the attraction for the permanent magnet moving away from the electromagnet. The voltage applied appears like graph 106, but the current will have a significant rise and fall time. The voltage at the beginning of a rise can be increased to raise the current faster. Tests by applicant on the coils constructed by them, indicate that the time constants of the coils are small enough that the current can be readily changed in several steps during each about 20° of turning, during rotation of the rotor at a relatively high speed such as twelve revolutions per second. The time aptitude and duration of voltage pulse application relative to the position of the rotor, can be varied as the speed of rotor rotation varies.

Figure 9:
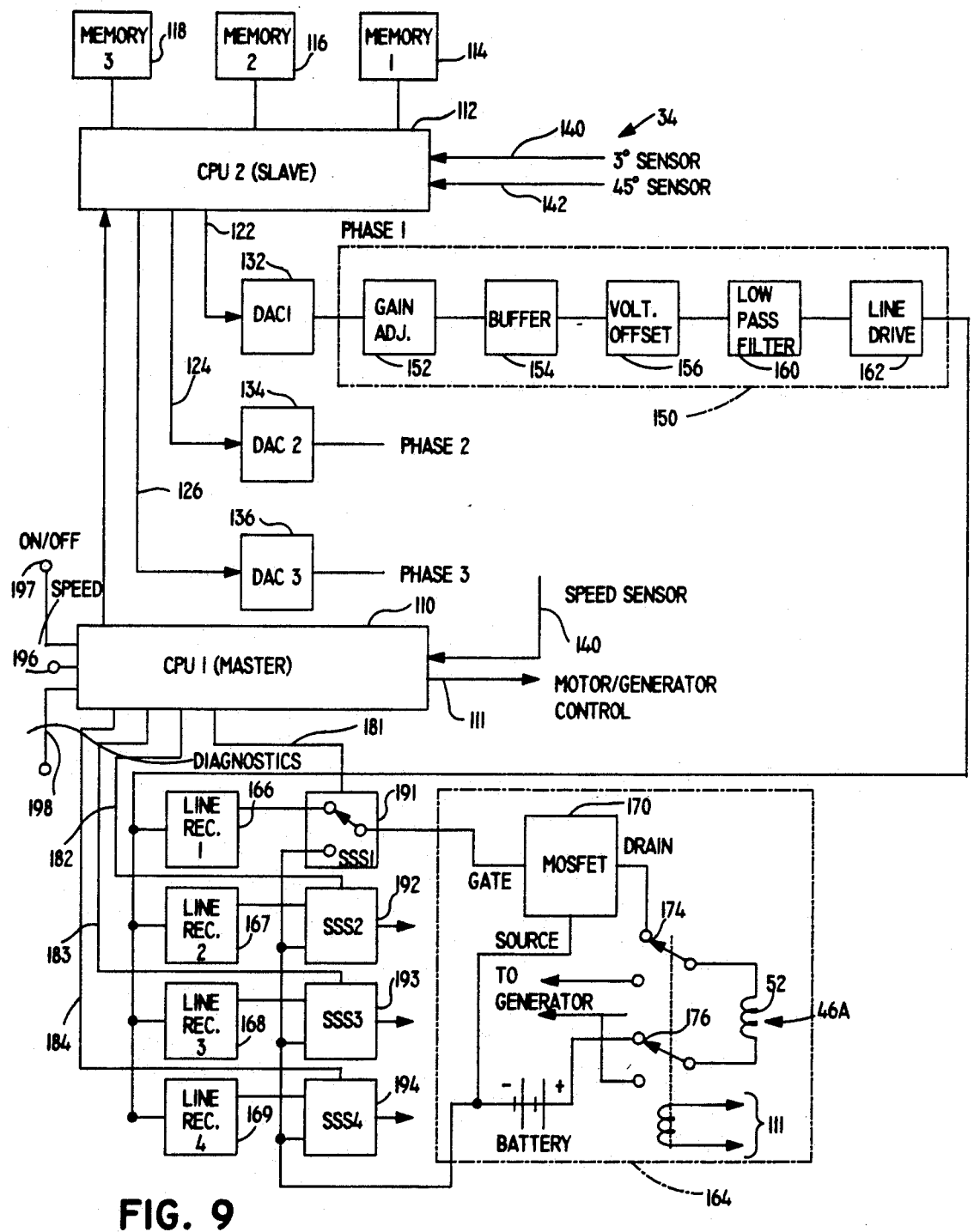
FIG. 9 is a primarily block diagram of the control circuit of the motor of FIG. 1.

FIG. 9 illustrates details of the control circuit which can control the motor of FIGS. 1-6. The circuits include two programmed CPU's (central processor units), CPU1 numbered 110 and CPU2 numbered 112. CPU1 is used as a master control and CPU2 as a slave. Motor on/off and speed control are functions of CPU1 and the phasing of electromagnets is the main function of CPU2.

Three memory segments 114-118 are attached to CPU2. Each memory segment 114-118 stores a "look up" table representing the current to be applied to a particular coil during rotation of the rotor. Referring to FIG. 2, it can be seen that the coils operate in four groups, called phase units, each of which includes three coils, with the first group including coils of electromagnets 46A, 46B and 46C. At any given time, the current applied to the first electromagnet 46A of the first group of three, is the same as the current applied to the first electromagnet 46D of a second group of three electromagnets 46D, 46E and 46F (and the first electromagnets 46G, 46J of the other groups). Thus only three memories or "look up" tables are required, one for each of the three coils in each phase unit.

Referring to FIG. 9, memory 114 is a look up table listing the current or voltage to be applied to the first coil of each phase unit, during each 3° of rotor rotation. 3° was chosen because the index wheel (26 of FIG. 1) has markings 120 (in the form of slots or reflectors) spaced 3° apart around the axis of rotation. It may be noted that the index wheel has markings 122 indicating every 45° of rotor rotation. After each 3° of rotor rotation, the three memories 114-118 deliver a new signal indicating the new level of current to a corresponding one of the three coils or electromagnets in a phase unit. The detector (30 of FIG. 1) is of special design. The output of a central infrared emitter is reflected back into one of two infrared detectors depending on whether a 3° or a 45° slot (reflector) is in line with a narrow slit on the side of the detector unit 30 facing the index wheel.

The slave CPU2 112 has three outputs 122-126 that each represents the current to be delivered to one of the three coils in a phase unit (there are four phase units). Each output is connected to a corresponding one of three DAC (digital analog converters) 132-136. The inputs to the slave CPU2 112 includes a first input 140 which carries a pulse after every 3° of rotor rotation, which is obtained from one of the index sensors of detector 30 of FIG. 1. Another input 142 is a pulse that is delivered after every 45° of rotor rotation, which results in the resetting of circuits in the slave CPU2 112. Input 140 is also used as a speed detector for load-speed control by CPU1. The output of each DAC such as 132 is an analog signal which is delivered to a circuit portion 150 that operates as a set of operational amplifier components (designed to be supplied with plus and minus 15 volts) as such components are inexpensive and readily available.

The first part 152 of the subcircuit 150 is a gain adjuster 152 whose output is delivered to a buffer 154 which rejects extraneous signals. The output of the buffer is delivered to a voltage offset circuit 156 which offsets the input voltage to take account of the fact that the MOSFETS to be used for coil current control later in the circuit require a threshold offset of approximately 3.1 volts. The output of offset circuit 156 is delivered to a low pass filter 160 which rejects high frequency noise and whose output is delivered to a line driver or operational amplifier 162. The output of the line driver 162 is delivered to one of several line receivers 166-169. A second circuit portion 164 operates at plus 24 volts to be consistent with the output of two series connected 12 volt lead storage batteries. The output of the line driver 166 is delivered to a solid state switch SSS1 191 which controls the input to an operational amplifier consisting of two parallel MOSFETs 170. The level of input voltage at the gate of the MOSFETs controls the current applied to the electromagnet coil 52 of electromagnet 46A. The outputs of the other line drivers 167-169 pass through solid state switches 192-194 and through circuits similar to portion 164, to energize the coils 52 of electromagnets 46D, 46G, and 46J, respectively.

The motor can be operated in a generator mode where the electromagnets are disconnected from the driving MOSFETs and connected to battery charging units. This is accomplished by means of the relay contacts 174 and 176. These are shown in the motor drive configuration, which would be the normally on configuration. Activation of the relays by signals 111 from the master CPU1 110, disconnects the driver circuits and connects the recharging circuits.

Each of the electromagnet coils 52 of the motor has a dual control. When the solid state relay SSS1 191 connects the line receiver 166 to the MOSFETs 170, current through the coils is under control of the slave CPU2 112. When SSS1 191 is in its alternate position, the gates of the MOSFETs are brought to the same voltage as the source, thus shutting off the MOSFETs. As mentioned above, switches 191–194 control the delivery of current to the coils of the first electromagnets 46A, 46D, 46G and 46J of the four groups of three electromagnets each. The second and third coils of each phase group are controlled by similar solid state switches. At any one time, an entire phase group (of three coils) can be turned on or off. The master CPU1 110 has outputs (four of them shown as 181–184 in FIG. 9) which control the solid state switches. This allows the master CPU1 to stop the flow of current through any of the four coils 52 of the four electromagnets 46A, 46D, 46G or 46J during the time when current is flowing through the other of the four coils. The same applies to the second and third coils of a given phase group. Thus, during an entire rotor turn, a coil can be "taken out" along with the other coils in its phase unit when the motor is under low load conditions or one of the coils is found defective by diagnostic circuits 198. This provides for an ongoing "diagnostic" control of electromagnet behavior, thus preventing "lock up" conditions when one phase group has an excessive "back torque" due to coil failure.

The master CPUI 110 can be adjusted for constant speed at various loads by detecting changes in speed via the 3° sensor 140. Speed can also be controlled manually through input 196 to CPU1. The motor is turned on and off through input 197. The direction of rotor rotation can be reversed by switching the phases, so in FIG. 4 only electromagnet 46C is energized to negate, at the position of FIG. 6 only electromagnet 46B is energized, etc.

As discussed above, applicant prefers to use permanent magnets of Nd-B-Fe (neodymium-boron-iron), which have only recently (about 1986) been available. Such permanent magnets have such high induction (so the grains are stiffly held) that they do not demagnetize themselves even when they have a small thickness between their opposite ends that have different magnetic polarities. Previous good magnetic materials such as the Alnico magnets, typically required a thickness between their opposite poles, of about two and one half times their width and thickness in order to avoid self demagnetization. Applicant has found that the present magnets of Nd-B-Fe retain their magnetism (an intensity of about 4 kilogauss) even with very small thicknesses. Applicants originally used magnets with faces of one inch width and one inch length, having a thickness of one inch (two one-half magnets in series), and then used magnets of the same size except they had a thickness of one half inch. Applicants also made tests using magnets of one-quarter inch and one-eighth inch thick. Much thinner magnets have been used. Much thinner magnets have been difficult to use because of limited mechanical strength in that they are more likely to break from the large forces encountered. Even with one eighth inch thick magnets of Nd-B-Fe, applicant found that no self demagnetizing occurred. Even smaller thicknesses are expected to result in stable permanent magnets.

There is an advantage in using thinner magnets, in that with the thickness of the magnets decreased by fifty per cent, as from one inch to one half inch, the magnetic field strength decrease by only about ten per cent. These magnets act largely like part of an air gap, and a thinner magnet can reduce the equivalent air gap between the faces (72, 70) of the permanent magnet and the faces of the cores of the electromagnets they pass across, to provide large attraction forces despite the need for reasonable air gap widths on the order of one or a few millimeters. Thus, it appears likely that thinner magnets of high coercive strength such as Nd-B-Fe type would be preferred. As mentioned above, Nd-B-Fe magnets first appeared in about 1986, and it appears likely that magnets of this general type but with greater mechanical strength and/or greater flux density and coercivity may be available in the future. Grain oriented magnets, with the grains oriented at 15°, 30° or up to 45° instead of the 0° currently available, may enable negating current to be applied during a shorter time period for a given motor geometry.

Figure 10:
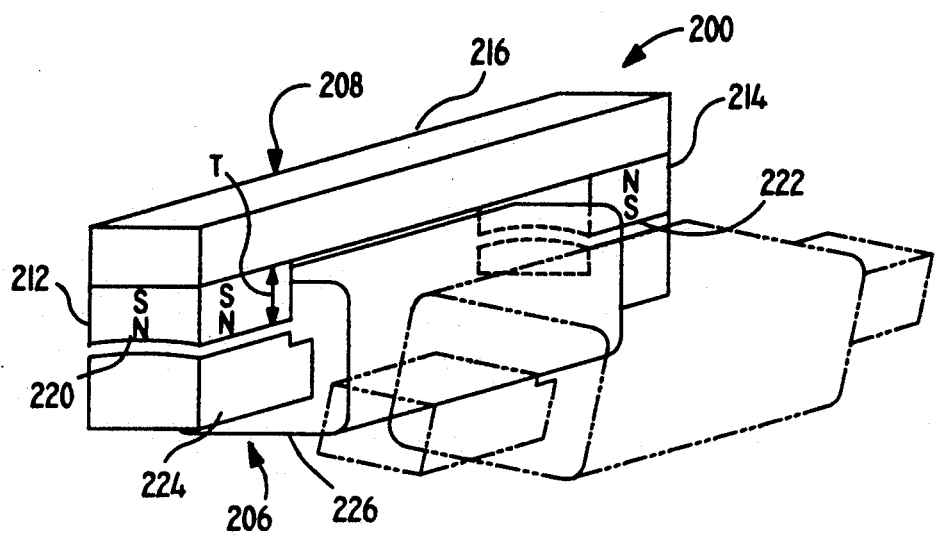
FIG. 10 is a partial isometric view of a rotor-stator module of a motor constructed in accordance with another embodiment of the invention.
Figure 11:
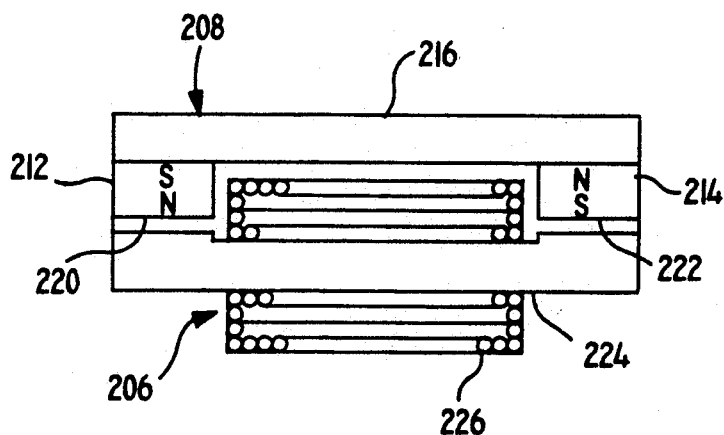
FIG. 11 is a sectional view of a permanent magnet device and electromagnet of the module of FIG. 10.
Figure 12:
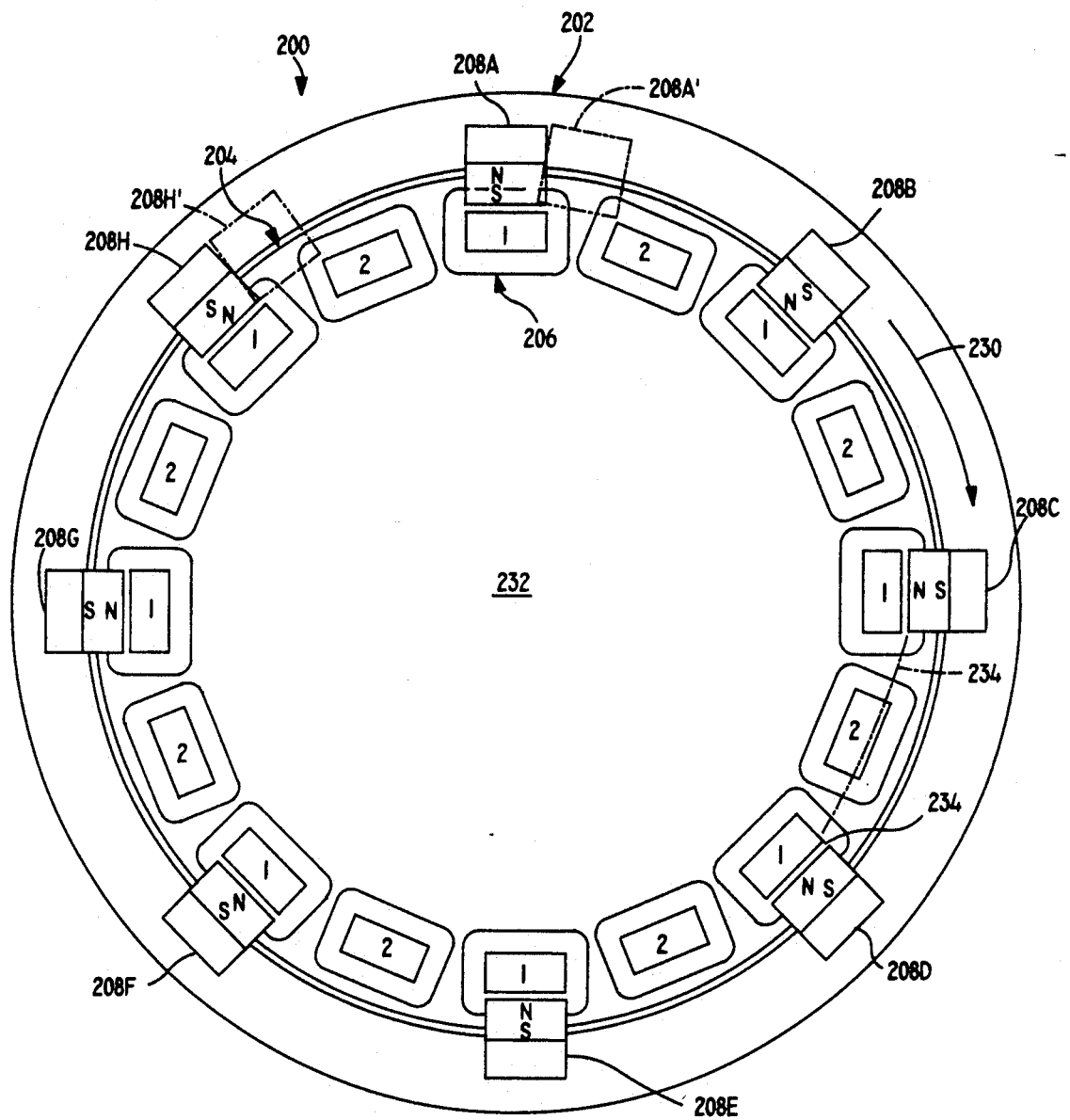
FIG. 12 is a front elevation view of a motor which comprises modules shown in FIG. 10.

FIGS. 10–12 illustrate a motor 200 constructed in accordance with another embodiment of the invention, which provides a "closed magnetic loop" arrangement and a 2:1 ratio of electromagnets to permanent magnets. In the particular motor 200 (FIG. 12), the rotor 202 extends around the stator 204, this motor being designed for use in the wheels of electric autos. The stator 204 includes eighteen electromagnets 206 while the rotor 202 includes nine permanent magnets 208A 208H arranged as shown. The permanent magnets and electromagnets are basically arranged in nine units, with each unit including two electromagnets labeled "1" and "2" and one permanent magnet 208. This arrangement results in fewer permanent magnets than the arrangement of FIGS. 1–6, and results in a greater space between adjacent permanent magnets.

FIG. 11 shows the construction of each electromagnet 206 and permanent magnet or permanent magnet device 208. Each permanent magnet 208 include two permanent magnet elements 212, 214 of material of high induction and magnetic flux density such as Nd-B-Fe, and a magnetic circuit bar 216 of material such as laminated silicon steel magnetically coupling the permanent magnet elements. The permanent magnet elements are arranged so one pole face 320 is of North magnetic polarity, while the opposite pole face 222 is of South magnetic polarity. The electromagnet 206 includes a core 224 formed of "soft" magnetic material and a winding or coil 226 around its middle. The "soft" magnetic core can be constructed of conventional laminated silicon steel, or of newer materials such as sintered phosphorus iron which has very low hysteresis. The arrangement shown in FIG. 11 provides space for fitting the winding 226 between the permanent magnet pole faces 220, 222. This arrangement may be referred to as a closed magnetic circuit arrangement in that both poles of the permanent magnet and of the electromagnet are used.

Referring again to FIG. 12, after a 11.25° turn of the rotor 202 in the direction 230, each permanent magnet then lies in a position such as 208A'. Each permanent magnet 208A then lies halfway between a pair of electromagnets "1" and "2". With the rotor turning in the direction of arrow 230 about its axis of rotation 232, the coil of the first electromagnet 206 labeled "1" will be energized in an amount to negate backward attraction of the permanent magnet 208A, by the electromagnet "1". (The coils of the other first electromagnets labeled "1" will be similarly energized.) The other electromagnet "2" is not energized, and the resulting torque tending to rotate the rotor occurs due to attraction of the permanent magnet 208A, for the ferromagnetic core of the unenergized second electromagnet "2". The advantage of this arrangement is that the negating current applied to electromagnet "1" can continue longer. That is, the negating current can continue while the permanent magnet 208A' lies further from the electromagnet "1" because such negating current will not have much effect on the approaching permanent magnet at 208H' since the magnet at 208H' is further away.

In a motor of the type shown in FIGS. 10-12 that applicants have designed, each permanent magnet element such as 212 had a width and length of one inch and a thickness T of one half inch, while the magnetic circuit bar 216 had a thickness of one half inch and a length of about three inches. The diameter of the interface or air gap circle 234 was one foot, and the poles of the electromagnets were spaced apart by about 1.1 inches. Three of such arrangements of permanent magnets and electromagnets enable the production of a large starting torque at any initial rotational position of the rotor.

Thus, the invention provides a motor of the type that has permanent magnets (usually but not always on the rotor), which operates with high efficiency. This is accomplished by energizing the electromagnets so the "last" electromagnet which a permanent magnet is moving away from, is energized with a negating current which largely minimizes or eliminates backward forces on the permanent magnet, while torque tending to rotate the rotor is obtained by the magnetic attraction of the permanent magnet for the core of the "next" electromagnet that the permanent magnet is approaching. At times when especially high power is required, as during acceleration or travel at high speeds, additional torque can be obtained by energizing the electromagnet so the "last" electromagnet actually repels the permanent magnet with a large force and the "next" electromagnet is energized to increase attraction for the permanent magnet. However, during operation at moderate loads (e.g. an auto traveling at 30 mph which is capable of travelling at over 60 mph, so the load is less than half maximum load), such additional currents to create substantial repulsion and to enhance attraction may not be necessary, and most of the torque output of the rotor is that which would be obtained merely by completely negating backward attraction and employing no current for energization for forward attraction. The negating current can be changed or varied as a permanent magnet moves away from an electromagnet, so as to maintain a largely zero magnetic force between the permanent magnet and last electromagnet.

The permanent magnets can be thin compared to the dimensions of their faces, where magnets of high coercive strength are used. At low power levels, the number of "units" (e.g. three electromagnets and two magnets or two electromagnets and one magnet) operating can be reduced to obtain higher efficiency. The amount of negating current can be varied to be somewhat greater or less than that required for complete negation at any given relative position of the permanent magnet, so as to adjust the speed of the motor for a given load. The sizes of the electromagnet coils can be relatively small (thinner wire and fewer turns) compared to those of conventional motors, because only a low magnetic field is required from the coils to negate backward attraction. The computer that drives the motor, can sense the operation of any unit (e.g. which includes three or two electromagnets) to determine whether or not the electromagnets are operating properly. For example, if the ratio of voltage to current passing through the winding of an electromagnet is above or below predetermined ratios, this may indicate that there is an open circuit or short circuit in that electromagnet. The computer can then "take out" a defective electromagnet by not passing a negating current through it.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:
1. An electric motor comprising:
    a rotor having an axis of rotation and having a plurality of permanent magnets spaced about said axis;
    a stator having a plurality of electromagnets spaced about said rotor axis, each of said electromagnets having a core of magnetic material and a coil, said electromagnetics being spaced relative to said permanent magnets, so as said rotor rotates in a first direction, then during a predetermined angle of rotor movement a first of said permanent magnets moves away from a recently attained center alignment position with a last of said electromagnets and a second of said permanent magnets moves toward a soon-to-be-attained alignment position with a next of said electromagnets;
    a control circuit coupled to said electromagnets to energize them, said circuit being constructed so during motor operation at moderate loads, said circuit does not substantially energize said next electromagnet as said second magnet moves toward said alignment position therewith so most attractive force between said second magnet and next electromagnet arises from the attraction of said second magnet toward said magnetic core of said next electromagnet, and said circuit energizes said last electromagnet primarily to negate the backward attraction of said first magnet for said magnetic core of said last electromagnet, so that more of the torque arising from interactions of said last and next electromagnets with said first and second magnets tending to rotate said rotor in said first direction, arises from the attraction of said second magnet toward said core of said next electromagnet in its unenergized state than any repulsion of said first magnet from said last electromagnet plus any attraction of said second magnet for said next electromagnet arising from energizing of said next electromagnet.

2. The motor described in claim 1 wherein:
    said circuit is constructed so the average repulsion between said first magnet and said last electromagnet during an angle of rotor rotation between a position wherein said first magnet and last electromagnet are aligned and a position wherein said second magnet and next electromagnet are aligned, is substantially zero.

3. The motor described in claim 1 wherein:
    the ratio of the number of said electromagnets to the number of said permanent magnets is 3 to 2, and said electromagnets and permanent magnets operate in groups that each includes three electromagnets identified as EMA, EMB and EMC wherein EMB lies between EMA and EMB, and includes two permanent magnets identified as PM1 and PM2, where when PM1 of a group is in center alignment with EMA then PM2 of the group lies approximately half-way between positions of center alignment with EMB and EMC of the group;

said control circuit is constructed so when said PM1 is in center alignment with said EMA, then only said EMB is energized considerably, with said EMB being energized in a direction to largely negate any attraction of PM2 and EMB.

4. The motor described in claim 1 wherein:
the ratio of the number of said electromagnets to the number of said permanent magnets is 2 to 1.

5. The motor described in claim 1 wherein:
each of said permanent magnets has first and second opposite magnet poles of opposite magnetic polarity with each magnet pole having a magnet face, the core of each of said electromagnets has first and second opposite core poles that each has a core face, and said permanent magnets and cores are arranged so said first magnet poles move closely facewise across said first core poles and said second magnet poles move closely across said second core poles as said rotor turns.

6. The motor described in claim 1 wherein:
said control circuit is constructed to change which of said electromagnets are energized during a second complete rotation of said rotor as compared to the electromagnets energized during a previous first complete rotation of said rotor.

7. A method for controlling energization of the electromagnets of a motor during moderate load conditions, wherein the motor has a stator assembly and a rotor assembly, wherein a group of permanent magnets are mounted on a first of said assemblies and spaced in a circle thereon, and a group of electromagnets are mounted on a second of said assemblies and spaced in a circle thereon, where each electromagnet has a core of magnetically attractive material and an energizable coil, comprising:

energizing each of a plurality of said electromagnets during at least some of the time when the closest permanent magnet is moving away from the last adjacent electromagnet that said closest magnet lay adjacent to, with each said last adjacent electromagnet energized to substantially negate the magnetic attraction between said closest permanent magnet and the core of said last adjacent electromagnet, so most motor torque which is produced by all permanent magnets and electromagnets, tending to rotate said rotor in a first direction in which said rotor is rotating, results from the level of magnetic attraction of each closest permanent magnet to the core of each next adjacent electromagnet that said closest permanent magnet is approaching that would exist in the absence of energization of said next adjacent electromagnet.

8. The method described in claim 7 wherein:
each said permanent magnet moves 100 per cent of the alignment spacing angle between positions of center alignment with a last and a next electromagnet core;
said step of energizing includes applying current to a last electromagnet which increases as the corresponding permanent magnet moves from a first position spaced ten per cent of the alignment spacing angle away from alignment with the last electromagnet, and a second position spaced 30 per cent of the alignment spacing angle away from the last electromagnet.

9. An electric motor of the type which includes a rotor having a plurality of permanent magnets and a stator having a plurality of electromagnets that each comprises a core of ferromagnetic material and a coil, with each permanent magnet and each core having at least one face lying on an imaginary interface circle, wherein the motor also includes a control circuit which is responsive to the rotation angle of said rotor to control energization of said electromagnets, characterized by:

said control circuit is constructed to energize each first electromagnet primarily during a time period during which a first permanent magnet face that was most recently aligned with the electromagnet core face of said first electromagnet is moving away therefrom, until a second permanent magnet face that is approaching said first electromagnet lies as close thereto as said first permanent magnet, with the energization of said first electromagnet during said time period being substantially in an amount to negate backward attraction of said first permanent magnet for said core of said first electromagnet, during operation of said motor at moderate load conditions.

* * * * *